United States Patent [19]

Budd et al.

[11] Patent Number: 5,072,611

[45] Date of Patent: Dec. 17, 1991

[54] APPARATUS AND METHOD FOR TESTING WHEELS, BEARINGS AND LUBRICANTS

[75] Inventors: James M. Budd, Troy; Philip W. Sheehan, Tipp City; John H. Warren, Troy, all of Ohio

[73] Assignee: The B. F. Goodrich Company, Akron, Ohio

[21] Appl. No.: 577,417

[22] Filed: Sep. 4, 1990

[51] Int. Cl.$^5$ ............................................. G01M 19/00
[52] U.S. Cl. ......................................... 73/118.1; 73/10
[58] Field of Search ................. 73/118.1, 10, 64, 865.6

[56] References Cited

U.S. PATENT DOCUMENTS

| | | | |
|---|---|---|---|
| 2,033,588 | 3/1936 | Pigott et al. | 265/10 |
| 2,872,805 | 2/1959 | Cochran, Jr. et al. | 73/10 |
| 2,957,335 | 10/1960 | Dmitroff | 73/10 |
| 3,152,468 | 10/1964 | Powell | 73/8 |
| 3,491,587 | 1/1970 | Morris et al. | 73/117 |
| 3,529,783 | 9/1970 | Alsbach et al. | 241/284 |
| 3,715,909 | 2/1973 | Wolanin | 73/9 |
| 3,821,893 | 7/1974 | Klinger et al. | 78/118 |
| 3,913,394 | 10/1975 | Niehaus | 73/118 |
| 3,946,593 | 3/1976 | Ruget | 73/10 |
| 4,000,656 | 1/1977 | Moioli | 73/432 |
| 4,133,201 | 1/1979 | Klinger | 73/12 |
| 4,501,139 | 2/1985 | Petersen | 73/118 |
| 4,862,738 | 9/1989 | Jankowski | 73/118 |

FOREIGN PATENT DOCUMENTS 917059  3/1982  U.S.S.R. ................... 73/64

Primary Examiner—Jerry W. Myracle
Attorney, Agent, or Firm—David M. Ronyak

[57] ABSTRACT

Test apparatus comprises a wheel means including a hub and wheel web rotatably mounted on wheel bearings set in the wheel hub and mounted on a non-rotatable axle mechanism. The wheel means is rotatable by motor means. A load application mechanism including hydraulic load cylinders and load sensors effects selective imposition of radial, axial and moment loading upon the wheel web, wheel hub and wheel bearings so that the bearings experience operting conditions during rotation and at rest. Acoustic sensing means enable determination of the onset of bearing failure. Operation of test apparatus is preferably controlled by a computer.

21 Claims, 7 Drawing Sheets

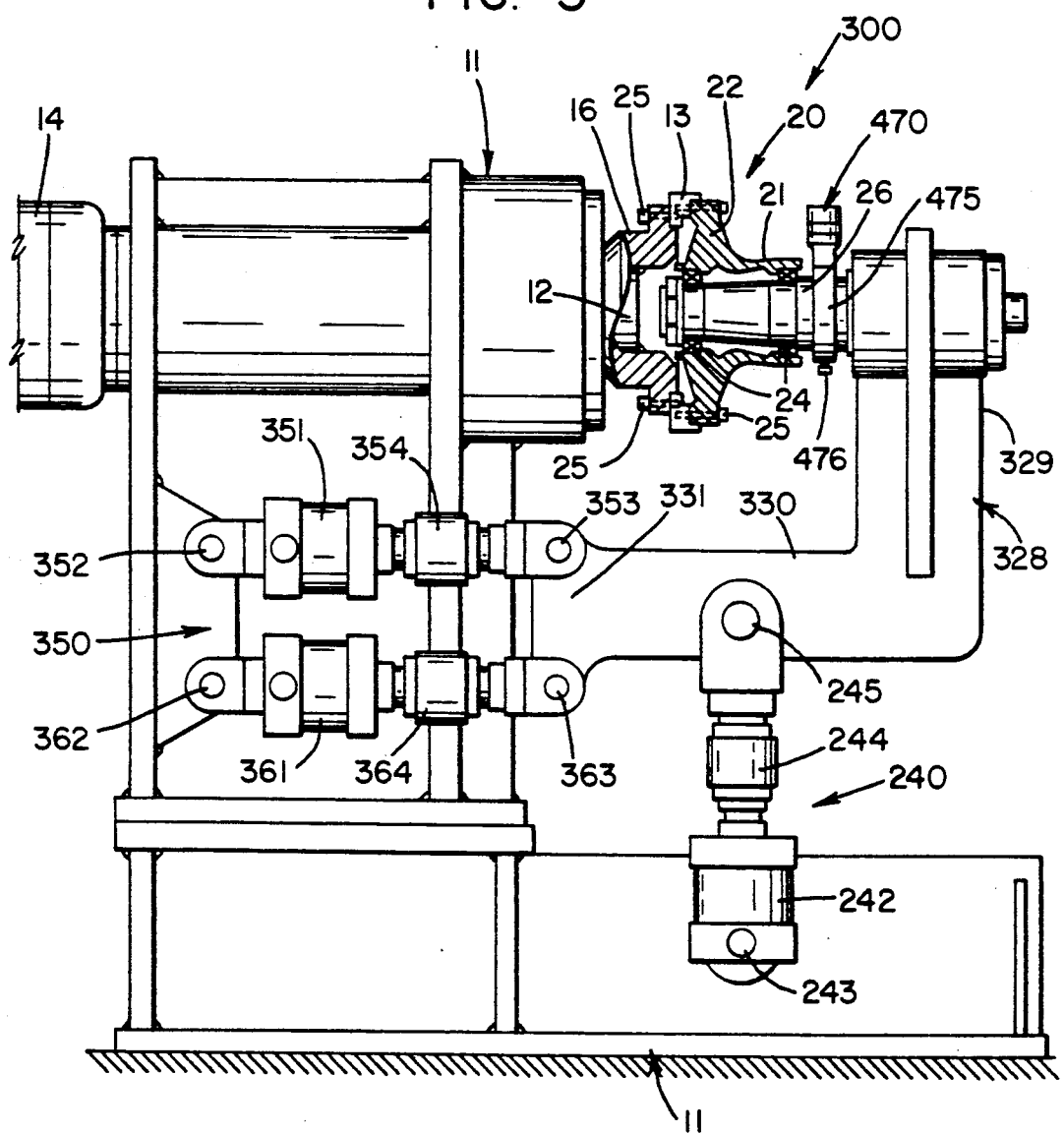

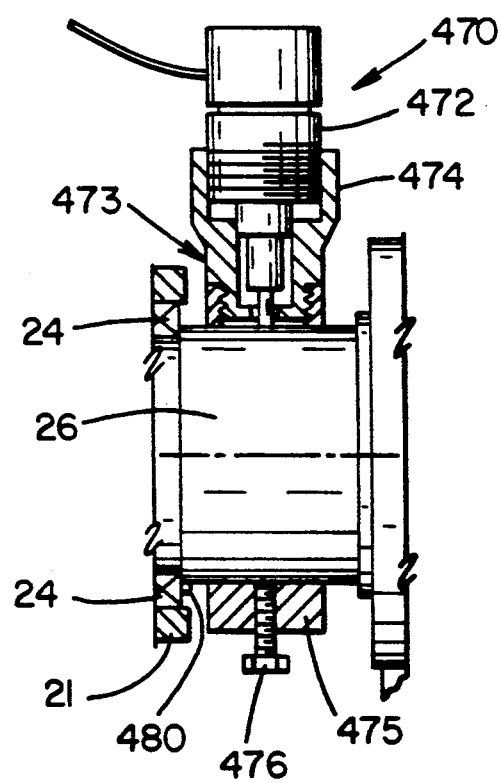

APPARATUS AND METHOD FOR TESTING WHEELS, BEARINGS AND LUBRICANTS

The present invention relates generally to a test apparatus and method for testing wheels, wheel bearings and lubricants and, in particular, to an apparatus and method suitable for testing aircraft wheels, and bearings and lubricants for such wheel.

BACKGROUND OF THE INVENTION

Many devices have been provided to test wheels, wheel bearings and lubricants prior to utilization in their intended environment. Few, if any, of these devices are able to provide a test apparatus and method that simulates in a realistic manner the operating environment encountered by an aircraft, including the capability of producing speeds and loads comparable to those developed during aircraft operation sequences including gate and ramp positioning, taxi maneuvers, take-offs, and landings.

SUMMARY OF THE INVENTION

According to the invention, there is provided test apparatus, comprising drive motor means connected with a fixed support, a wheel means including a hub and wheel web connected with the motor means and rotatable by the motor means through the wheel web connection, axle means upon which the wheel means is mounted via wheel bearings set in the wheel hub, a load application mechanism disposed in offset manner with respect to with said axle means, at least one movable connecting member connecting together the load application mechanism, and axle means, the axle means attached fixedly to the connecting member, load sensing devices associated with the load application mechanism, and control means, so that activation of the load application mechanism inherently effects through the axle means and wheel means the selective imposition of radial, axial and moment loading through the wheel web and wheel hub upon the wheel bearings so that the wheel bearings experience realistic operating conditions during rotation of the wheel means by the motor means and when the wheel means is at rest.

According to another aspect of the invention, there is provided a method for testing bearings by a testing apparatus, comprising the steps of (a) rotatably disposing wheel means including a hub and wheel web on axle means via bearings, (b) connecting the wheel web with motor means for rotation of the wheel, (c) attaching an axial and moment load mechanism to a movable connecting member connected fixedly with the axle means so that the axial and moment load mechanism is disposed in substantially offset manner relative to the axle means, (d) attaching a radial load mechanism to the movable connecting member so that the radial and moment load mechanism is disposed substantially orthogonal relative to the axle means, (e) providing control means for controlling operation of the testing system, (f) providing load sensing devices for sensing loads imposed by the mechanisms on the bearings, and (g) activating selectively, via the control means, the respective load mechanisms in order to effect through the axle means and wheel means the selective imposition of radial, axial and moment loading upon the bearings so that the bearings experience realistic operating conditions when the wheel means is at rest and during rotation of the wheel means by the motor means.

BRIEF DESCRIPTION OF THE DRAWINGS

The above and other features and advantages of the invention will become more apparent when considered in light of description of preferred embodiments of the invention, together with drawings illustrating same which together form a part of the specification. Like parts have been numbered alike in the Figures of drawing.

FIG. 3 is schematic representation, partly in section, of a further embodiment of test apparatus of the present invention.

FIG. 4 is an enlarged representation, partly in section of the acoustic/sensing means shown in FIG. 2.

The present invention provides a method and apparatus for simulating in a laboratory the actual operating conditions encountered by an aircraft wheel web, wheel hub and wheel bearings and lubricants during operation of an aircraft. Any desired combination of radial, axial and moment loads and rotational speed may be placed upon the components being tested and these can be varied with time and/or distance to simulate ramp positioning, taxi maneuvers, take-off, landing and so on. The onset of bearing failure may be determined by monitoring acoustic emissions from the bearings being tested and aborting the test when these acoustic emissions rise above a predetermined level. The onset of bearing failure may also be determined by monitoring the temperature and temperature rise of the bearings being tested and aborting the test when the temperature rise exceeds a predetermined amount.

Figure 1:
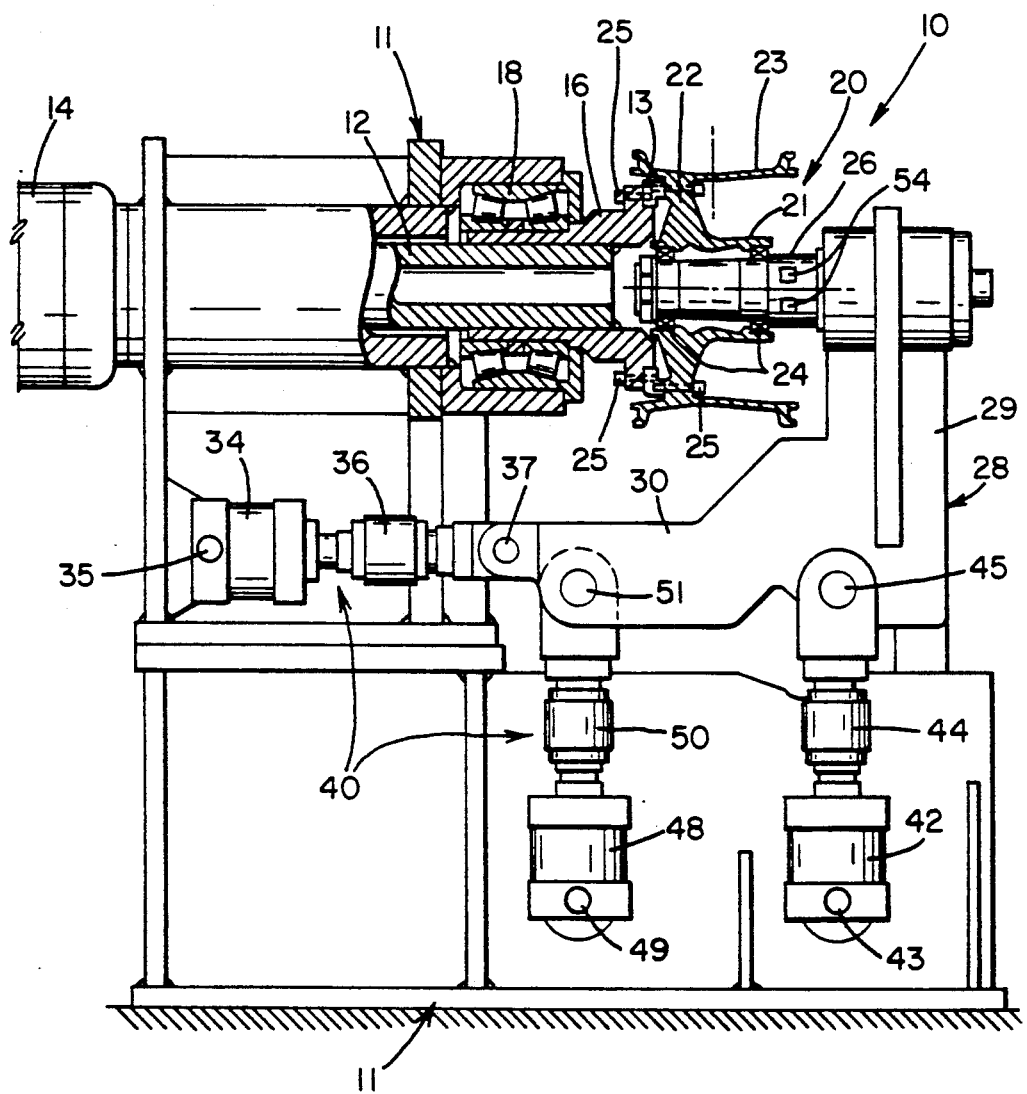
FIG. 1 is a schematic representation, partly in section, of a test apparatus according to an embodiment of the invention.
Figure 1A:
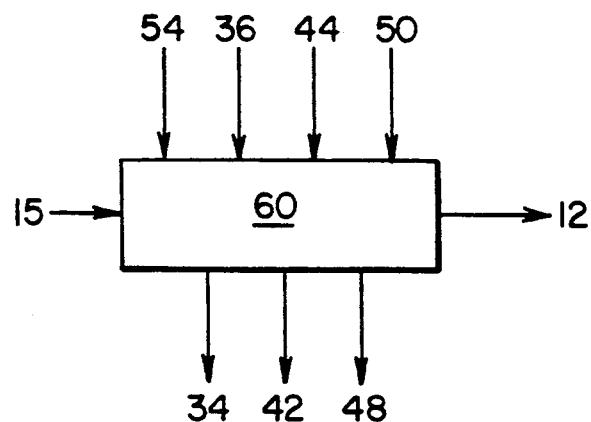
FIG. 1a is a schematic representation of a control mechanism configured for use with the embodiment depicted in FIG. 1.

Referring to FIG. 1, a preferred embodiment of a test apparatus of the present invention is indicated generally by reference numeral 10. Apparatus 10 comprises a motor 14 including a rotatable shaft 12 journaled within frame or support 11. The output end of the motor shaft 12 includes a drive shaft flange 16 which is supported against reaction loads by output shaft reaction bearings is supported in frame 11. The motor shaft flange 16 is shaped to receive and be coupled to or adjacent the outer periphery of the web 22 of the wheel 20 being tested. Aircraft wheel 20 may have its outer axially extending wheel rim 23 removed in order to simplify attachment of the drive shaft flange 16 to an annular adaptor 13 which in turn is secured to the wheel web 22 by bolts 25. These bolts may be inserted into the tie bolt holes normally provided in the outer periphery of the wheel web. The wheel 20 is mounted upon an axle means 26. Axle means 26 has positioned thereabout test bearings 24 which in typical aircraft wheel assemblies comprise tapered roller bearings. Other test bearings may be employed depending on the type of wheel and bearings to be tested. The outer races of test bearings 24 are fixedly located in known manner, e.g., by press fitting, within hub 21 of the wheel 20 being tested. The axle means 26 is fixedly attached in non-rotatable manner to the upper end of vertical leg 29 of L-shaped connecting member 28. In the embodiment shown, the upper end of vertical leg 29 of L-shaped member 28 includes an axially extending bore into which axle means 26 is received and secured in non-rotatable manner. The L-shaped connecting member 28 also includes a generally horizontally extending leg 30 which extends generally parallel but in radially offset manner relative to horizontally extending axle means 26. Disposed in offset manner from axle means 26 is a load application mechanism 40. Mechanism 40 includes an axial and moment load application mechanism comprising hydraulic load cylinder 34, pivotally attached at 35 to frame 11. The opposite end of hydraulic load cylinder 34 is connected in series with load sensor 36, pivotally attached at 37 to the end of the horizontal leg 30 of L-shaped connecting member 28. Located substantially orthogonally relative to axle means 26 is a pair of radial load application mechanisms comprising a pair of hydraulic radial load cylinders 42 and 48, pivotally attached at 43, 49 respectively to frame 11. The opposite ends of load cylinders 42, 48 are serially connected through load sensing means 44, 50 respectively to horizontal leg 30 of L-shaped connecting member 28 at pivotal attachments 45, 51 respectively. Load sensing devices 36, 44, 50 enable the loading forces effected by their respective associated hydraulic cylinders to be sensed and communicated to a control mechanism, such as control mechanism 60, illustrated schematically in FIG. 1a. Control mechanism 60 receives the sensed loads, outputs from sensors 36, 44 and 50 and ensures that the appropriate forces are effected by the respective cylinders in order to effect the desired loading forces on axle means 26 and thus on the wheel 20 and bearings 24 being tested. Control mechanism 60 may also receive sensed motor speed from sensor 15. Control mechanism 60 may also receive sensed load on a axle means 26 as sensed by transducers, i.e., strain gauges 54, on axle means 26. Control mechanism 60 is typically a computer. Control mechanism 60 may also receive bearing temperature and acoustic inputs.

Figure 2A:
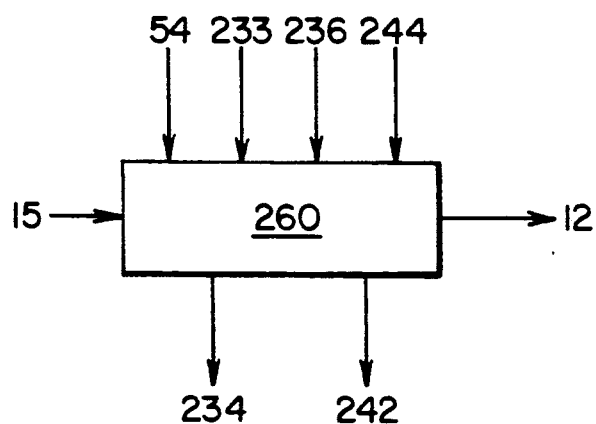
FIG. 2a is a schematic representation of a control mechanism configured for use with the embodiment of FIG. 2.
Figure 2:
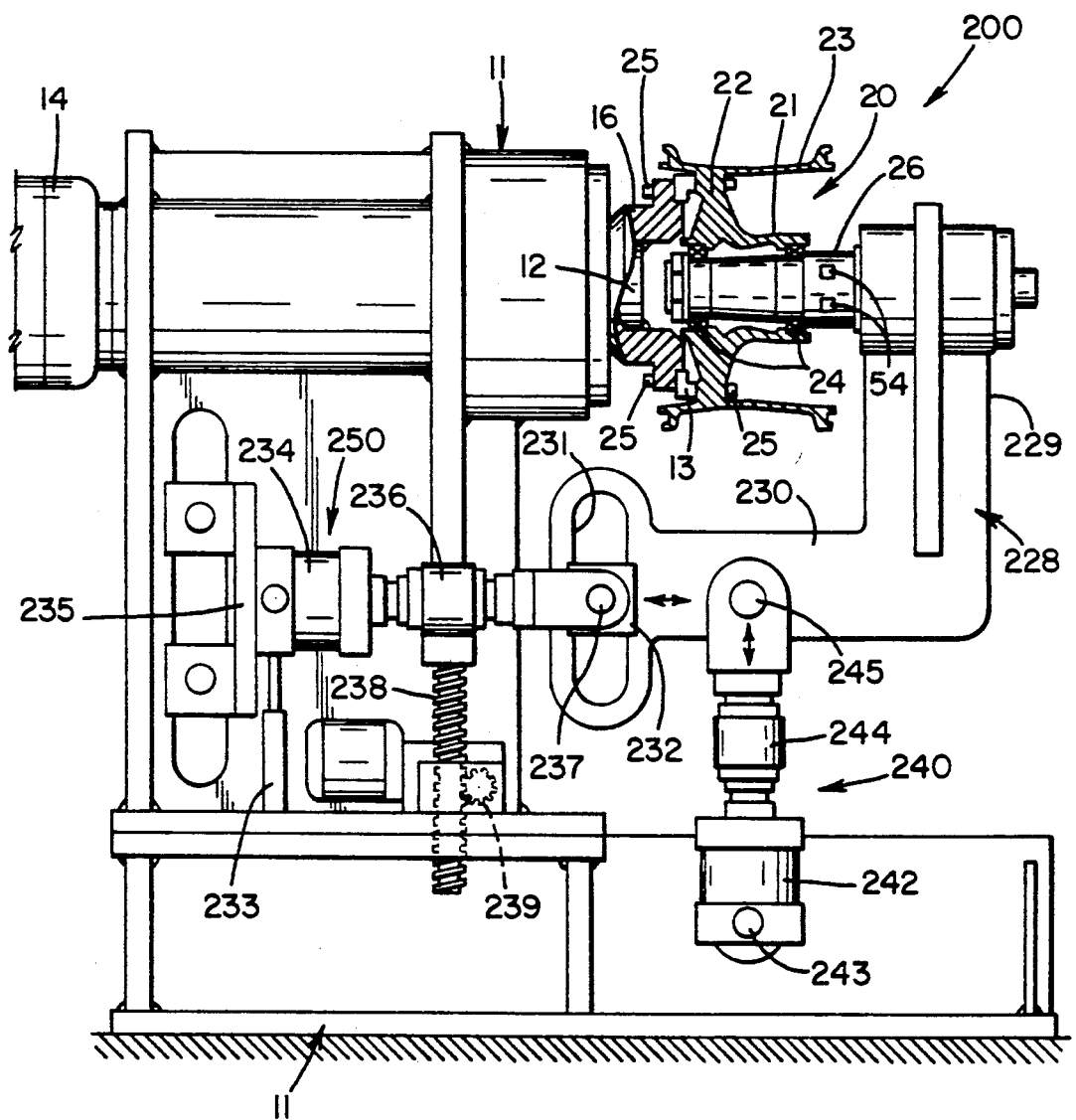
FIG. 2 is a schematic representation, partly in section, of another embodiment of a test apparatus according to the present invention.

Referring now to FIG. 2, there is shown another embodiment of test apparatus according to the invention. The motor drive shaft housing and drive coupling, axle means, wheel and bearings, as well as the vertical leg 229 of the L-shaped connecting 228 may be identical to that shown and described with respect to the embodiment of FIG. 1. Test apparatus illustrated in FIG. 2 is indicated generally by reference number 200. L-shaped connecting member 228 differs from that depicted in FIG. 1 and includes horizontal leg 230, including slotted end 231. The axial and moment load application mechanism 250 comprises hydraulic load cylinder 234 having one end affixed to sliding base block 235. The opposite end of hydraulic cylinder 234 is serially connected through load sensor 236 to sliding slot block 232 received in slotted end 231 of horizontal leg 230 of the L-shaped connecting member 228. The sliding slot block 232 is pivotally attached at pivotal attachment 237 to load sensor 236 which is serially attached to the end of the rod of the load cylinder 234. The axial and moment load application mechanism 250 is adjustable vertically by a linear actuator which may comprise jack screw 238 and motorized nut 239. The position of axial and moment load application mechanism 250 is sensed by position sensor 233. Raising of jack screw 238 effectively reduces the amount of radial offset relative to axle means 26 thereby and reduces amount of moment load applied for a given hydraulic pressure within load cylinder 234. Conversely, lowering jack screw 238 effectively increases the amount of radial offset and thereby the amount of moment load applied for a given hydraulic pressure in hydraulic load cylinder 234. The radial load application mechanism 240 comprises radial hydraulic load cylinder 242 attached to frame at pivotal mount 243, the opposite end of load cylinder 242, being serially connected through load sensor 244 to the horizontal leg 230 of L-shaped connecting member 228 at pivotal mount 245. Pivotal mounts 243, 245 are located in a plane generally corresponding to the centerplane of the test wheel 20. Control mechanism 260 schematically illustrated in FIG. 2a receives sensed loads from load sensors 244 and 236, position of the axial and moment load application mechanism from position sensor 233 and optionally from strain gauges 54 on axle means 26, motor shaft speed or rpm sensor 15 and outputs the signals which control motor speed, the forces effected by the respective cylinders, and cylinder position in order to effect the desired loading forces which are imputed to the controller.

Figure 3A:
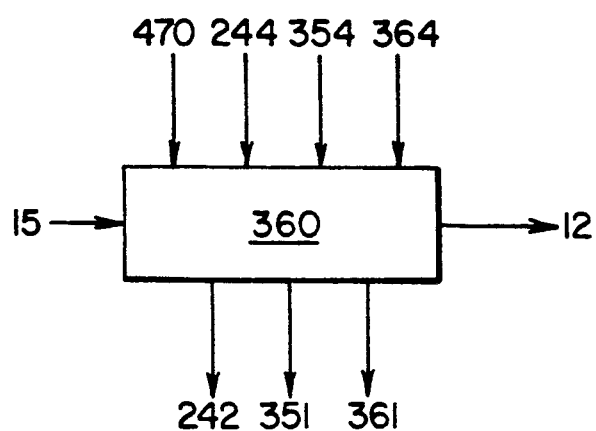
FIG. 3a is a schematic representation of a control mechanism configured for use with the embodiment of FIG. 3.

Referring now to FIG. 3, there is illustrated a further embodiment of a test apparatus according to the invention. Apparatus 300 differs from that described with respect to the embodiment shown in FIGS. 1 and 2 in the following manner. The load application mechanism comprises a radial load application mechanism 240 comprising radial load hydraulic cylinder 242 pivotally attached at 243 to frame 11. The opposite end of radial load cylinder 242 is serially connected through load sensor 244 to pivotal attachment 245 to the horizontal leg 330 of L-shaped connecting member 328. Located substantially parallel but radially offset relative to axle means 26 is moment and axial load application mechanism 350. Mechanism 350 comprises a pair of hydraulic axial and moment load cylinders 351, 361 disposed substantially parallel relative to axle means 26. Each of load cylinders 351, 361 respectively, is pivotally attached at 352, 362 respectively to frame 11 at a different distance from axle means 26. The opposite ends of load application cylinders 351, 361 are respectively connected serially through load sensors 354, 364 and pivotal attachments 353, 363 to the end 331 of the horizontal leg 330 of the L-shaped connecting member 328. In like manner to the other embodiments shown in FIGS. 1 through 3, the pivotal attachments 352, 362, 353, 363 permit movement of L-shaped connecting member 328 and thus the axle means 26 is movable by means of the movable L-shaped connecting member 328 to which the axle means is securely affixed in non-rotatable manner. Associated control mechanism 360 schematically illustrated in FIG. 3a receives sensed loads from load cylinder sensors 354, 364, 244 and motor shaft speed detector 15 and optional acoustic sensor 470 and outputs control signals to the load cylinders and motor. Control mechanism 360 may also receive signals from optional axle load sensors. Control mechanism 360 insures that the appropriate forces are effected by the respective hydraulic load cylinders in order to effect the desired loading forces which are imputed to the controller as well as motor speed.

Figure 5:
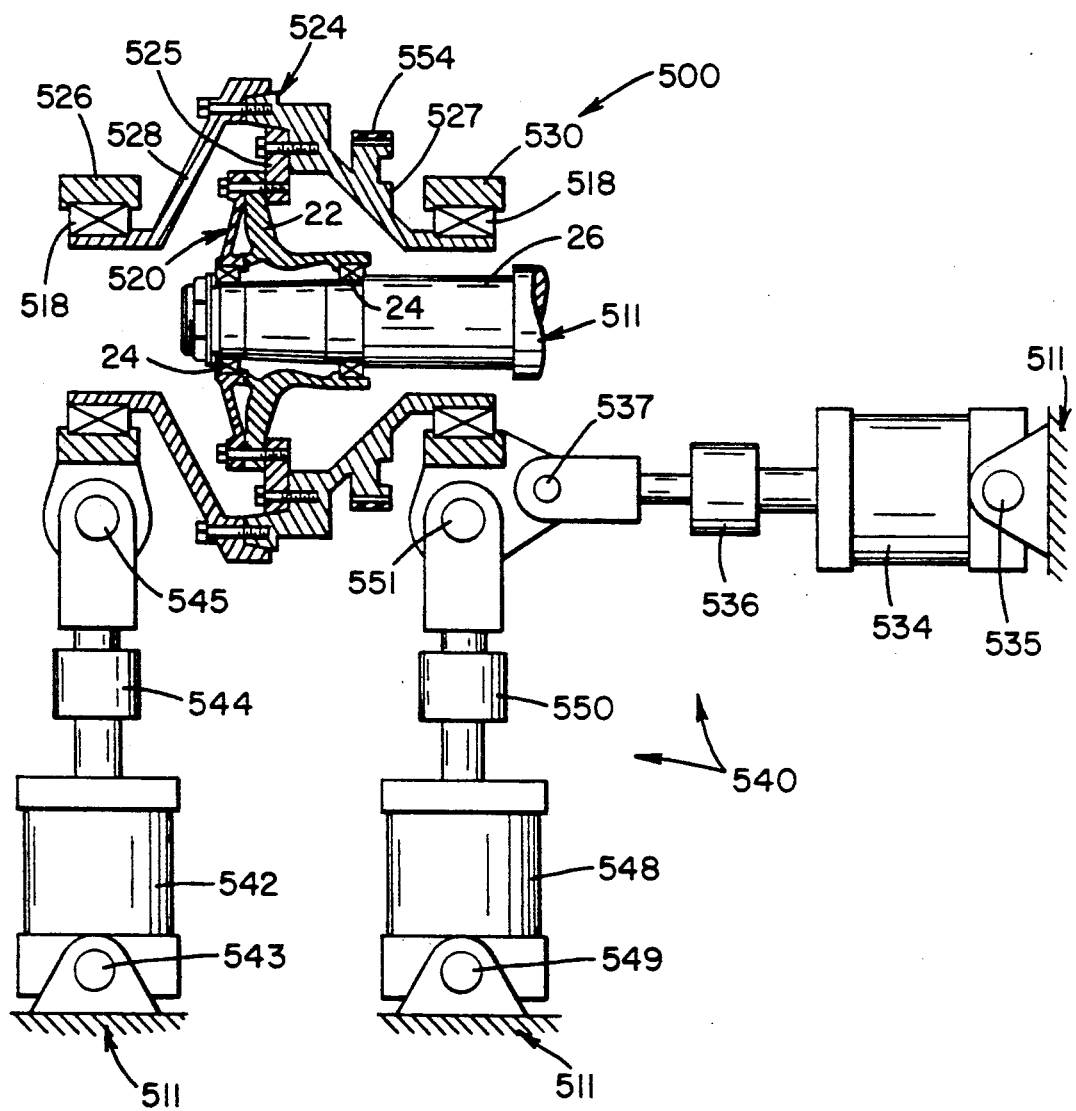
FIGS. 5 and 6 together form a schematic representation, partly in section, of a still further embodiment of test apparatus of the present invention.
Figure 6:
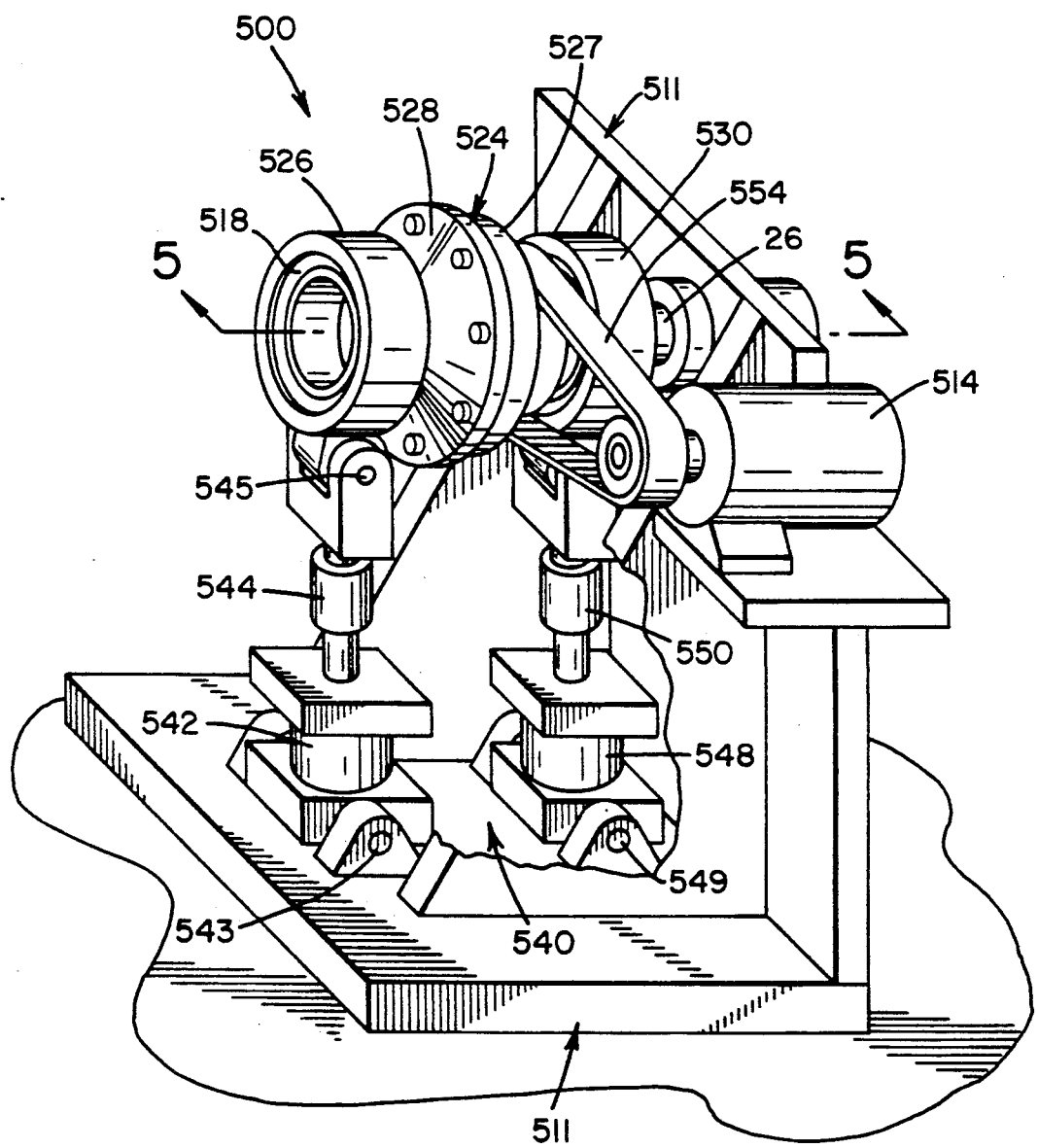

Referring now to FIGS. 5 and 6, there is illustrated a further embodiment of test apparatus according to the invention. Apparatus 500 differs from that described with respect to the embodiment shown in FIG. 1 in the following manner. The web 22 of test wheel 520 is coupled by bolting to annular adaptor ring 525 which in turn is coupled by bolting to annular drive coupling 524 which includes inboard and outboard portions or halves 527, 528, the inboard portion being located closer to the junction of the axle means 26 with vertical portion of frame 511. Outboard half of drive coupling 524 is rotatably journaled on machine load reaction bearing 518 in outboard bearing housing 526. The inboard half of drive coupling 524 is rotatably journaled upon machine bearing 518 within inboard bearing housing 530. The load application mechanism 540 is disposed in offset manner from axle means 26. Load mechanism 540 includes radial and moment load hydraulic cylinders 542, 548 respectively pivotally attached at 543, 549 to frame 511. The opposite end of hydraulic load cylinders 542, 548 are respectively connected in series with load sensors 544, 550, pivotally attached at 545, 551 to respective outboard bearing housing 526 and inboard bearing housing 530. Hydraulic load cylinders 542, 548 are located substantially orthogonally relative to axle means 26. Mechanism 540 also includes an axial and moment load application mechanism comprising hydraulic load cylinder 534, pivotally attached at 535 to frame 511. The opposite end of hydraulic load cylinder 534 is connected in series with load sensor 536, pivotally attached at mount 537 to inboard bearing housing 530. As in other embodiments, the load sensing devices enable the loading forces effected by their respective associated hydraulic cylinders to be sensed and communicated to a control mechanism. The control mechanism receives the sensed loads and ensures that the appropriate forces are effected by the respective cylinders in order to effect the desired loading forces on axle means 26 and thus on the wheel 520 and bearings 24 being tested. The control mechanism may also receive sensed motor speed and sensed load on the axle means 26 as sensed by transducers such as strain gauges and temperatures of the test bearing 24 as sensed by thermal sensors such as thermocouples. In contrast to the embodiments shown in FIGS. 1 through 3, motor 514 is coupled to the drive coupling 524 by cogged band belt 554. The use of such belt drive permits relative movement of the drive coupling 524 upon deflection of the axle means 26 and wheel 520 due to imposed loads. A V-belt, timing chain or the like could be utilized in place of cogged band belt 554. The inboard end of axle means 26 distal from test bearing 24 is fixedly secured in a non-rotatable manner to frame 511. The embodiment shown in FIGS. 5 and 6 is capable of applying radial, axial and moment loads to the test bearing 24 in a manner highly accurately simulating the imposition of loads on the wheel web in a manner corresponding to that occurring in an aircraft.

Additionally, any of the embodiments of the invention or variations thereof may be equipped with acoustic sensing means such as that generally indicated by reference numeral 470 in FIGS. 3 and 4. Acoustic sensing means includes microphone or piezoelectric pickup 472 and mounting means 473. Mounting means 473 comprising mounting adapter 474 and mounting ring 475 is positioned on axle means 26 as shown to minimize pickup of acoustic emissions from the output shaft reaction bearings 18 and to better enable recognition of a change in the acoustic emissions from test bearings 24. Mounting ring 475 is secured to axle means 26 by bolt 476. Acoustic sensing means 470 is retained and pickup 472 maintained in contact with axle means 26 by a rubber band wrapped around axle means 26 an acoustic sensing means 470. At initiation of a test cycle, the level of acoustic emissions generated by the test bearings 24 may be imputed to control mechanism as a base signal and a predetermined level of increase in such acoustic emissions may also be imputed to the control mechanism as an upper limit reference. Sensing of an increased level of acoustic emissions exceeding the preset differential or maximum reference level may be utilized to stop the test before complete failure occurs. Through use of this acoustic sensing means, the condition of the test bearings 24 may be monitored and observed prior to complete failure or destruction. After lubricant failure or lockup of a test bearing occurs, the cause of initiation of the failure is less able to be clearly discerned due to the extensive damage and degradation of the components involved.

Experience to date shows that ultrasonic equipment in the 28 kHz region will provide earlier detection than standard thermal monitoring approaches which detect actual failure but cannot predict such failure. The underlying theory of this acoustic monitoring approach is that as a bearing begins to fail, a subtle transformation in the material surface begins to occur which results in an increase in emission of ultrasonic sound waves. This occurs prior to finding evidence of a failing bearing that is audible to the human ear or visible to the human eye. As the bearing begins to fail it emits an increased ultrasonic signature which typically increases in amplitude without changing frequency. Once a baseline for a given bearing setup has been determined, it has been found that the acoustic signal will rise by about 10 to 12 decibels (dB) as incipient bearing failure arises. Catastrophic bearing failure will create a 20 dB or more increase in signal magnitude.

The bearing acoustic emission level expressed in dB is a measure of the sound intensity which is the average rate of sound energy transmitted through a unit area normal to the wave direction. The amount of sound power may be expressed mathematically as follows:

$$dB = 20 \log (SP/RSP)$$

where:
SP = Current sound pressure
RSP = Reference sound pressure ("zero")
log = logarithm to the base 10.

The acoustic transducer converts mechanical energy to electrical energy. Typical transducers are based on piezoelectric, electromagnetic, magneto restrictive or capacitive technologies. A preferred acoustic monitor is that available from UE Systems, Inc. of Elmsford, N.Y. as model UE 386. This acoustic monitor may be tuned for frequency and includes an adjustable sensitivity that will focus the monitoring area to a very small specific region; in this case the wheel bearings 24 of interest.

Experience to date indicates that roller end scoring of tapered roller aircraft wheel bearings is preceded by an increase in the acoustic signal as early as two to four simulated take-off and landing cycles prior to any change being observed upon monitoring by known standard temperature spike methods.

The test apparatus of the invention enables highly accurate and realistic simulation of a wheel means, wheel hub, wheel bearings, axle mounting features, bearing seals and lubricants in their intended environment. Axle mounting features include but are not limited to the bearing retainer nut, thrust washer, lock washer, and materials. Because the wheel and bearings are secured to an axle by a nut in a manner corresponding to typical aircraft installation, different bearing preloads may easily also be evaluated. At commencement of each test sequence, all load sensing devices, and acoustic emission receptors are zeroed to reference points wherein they are representative of an unloaded static position. Following start-up, the controller receives in real time via the sensing devices signals corresponding to the applied loads, speed, and preferably, noise generated by the test bearings, and optionally temperature variations. Recording devices may be connected to such sensing devices. Load sensing devices 54 may be employed on axle means 26 to provide verification of the composite applied loads magnitude. The motor effects rotation of the wheel being tested, while axial, moment and radial load application mechanisms are actuated selectively to provide singularly or in combination axial loading, radial loading and moment loading applied to the wheel and bearings being tested.

Referring to FIG. 1, the axial and moment load application mechanism 34 inherently and naturally imparts to the test bearings 24, axial and moment loading due to the load application mechanism being offset radially from axle means 26 rather than being coaxial therewith. Hydraulic cylinders 42 and 48 effect radial loading and may be actuated selectively to shift the imaginary plane at which the net radial load occurs or to entirely cancel out the moment load naturally induced upon activation of load cylinder 34. In operation, load cylinders 42 and 48 normally act in the same direction, i.e., by contracting but may do so at different force levels. Any combination of radial, moment, and axial load may be applied to the test bearings, except a net axial load, which does not exist in operating an aircraft.

In the embodiment depicted in FIG. 2, axial and moment load application mechanism 250, including hydraulic cylinder 234, may be adjusted vertically, thereby varying the amount by which the axial and load application mechanism 250 is radially offset relative to axle means 26. Thus, for a given force generated by hydraulic load cylinder 234, the amount of moment loading can be considerably reduced or vice versa. Hydraulic load cylinder 234 is configured to act in either extension or compression, thus permitting the radial load application mechanism, including hydraulic cylinder 242 to produce a net radial load if desired. Any combination of axial, radial and moment loads likely to occur in aircraft service may be achieved, except a net axial load which does not occur in aircraft service.

In the embodiment depicted in FIG. 3, hydraulic cylinders 351, 361 may be actuated selectively so that any combination of axial and moment load is applied to the wheel bearings, except a net axial load. Radial load application mechanism 340 enables selective application of any desired radial load. Operation of all load cylinders together enables achievement of any combination of axial, radial and moment loading likely to occur in aircraft service.

In the embodiment depicted in FIGS. 5 and 6, the hydraulic load cylinders of load application mechanism 540 may be actuated selectively so that any combination of radial, axial and moment load is applied to the wheel bearings 24, except a net axial load.

By controlling selectively operation of the motor and the hydraulic load cylinders, and, in the case of the embodiment of FIG. 2, the position of the axial and moment load application mechanism, via the controller, various operational sequences may be run to duplicate the environment which the wheel and wheel bearings experience during operation of an aircraft, including ground turns, drift landings, straight landings, take-offs, brake rolls, maneuvering at low speeds and towing or pushing. Drift landings, maneuvering and take-off operations contribute to severe wear of wheel bearings. The apparatus and method of the present invention enables duplication and repetition of any selected number of parameters any number of times in order to test component capability. Axle deflection, temperature rise, lubricant performance and bearing preload and bearing seal performance may also be tested. It is possible to impose infinite variations of loading upon the wheel bearings. Because, for example, the motor drive shaft flange such as flange 16 illustrated in FIG. 1, and the drive coupling 524 as illustrated in FIGS. 5 and 6, is connected to the wheel web 22 at or adjacent its outer periphery, i.e., generally corresponding to the tie bolt circle existent where two-piece wheels are employed, the resistance of the wheel web and wheel hub to dynamic stresses can also be evaluated. The wheel web and wheel hub regions may be provided with sensors to detect localized stresses and strains. Acoustic sensing means enables determination of the onset of bearing failure which is generally accompanied by an increase in such acoustic emissions. Upon detection of acoustic emissions above a preset reference level, the test may be aborted before further deterioration or total destruction of the bearings occurs.

Additionally, any of the aforedescribed embodiments or variations thereof may be equipped with thermal sensing means such as that generally indicated by reference numeral 480 in FIG. 4, typically a thermocouple. The output of thermal sensing means 480 may be imputed to control means such as control mechanism 360 and utilized to stop the test when a temperature rise exceeding a preset differential or maximum reference temperature is sensed. Rapid increases in bearing cone temperature can be correlated to roller end scoring damage.

The foregoing description and embodiments are intended to illustrate the invention without limiting it thereby. It will be understood that various modifications can be made in the invention which are obvious from the preferred embodiments which have been described in detail. These variations are intended to be included within the present specification and claims.

What is claimed is:

1. Test apparatus, comprising drive motor means connected with a fixed support, a wheel means including a hub and wheel web connected with the motor means and rotatable by the motor means through the wheel web connection, non-rotatable axle means upon which the wheel means is rotatably mounted via wheel bearings set in the wheel hub, a load application mechanism disposed in offset manner with respect to with said axle means, at least one movable connecting member connecting together the load application mechanism and one of the axle means and the wheel web, load sensing devices associated with the load application mechanism, and control means, so that activation of the load application mechanism inherently effects through the axle means and wheel means the selective imposition of radial, axial and moment loading through the wheel web and wheel hub upon the wheel bearings so that the wheel bearings experience realistic operating conditions during rotation of the wheel means by the motor means and when the wheel means is at rest, wherein the axle means upon which the wheel means is mounted via wheel bearings is movable, and a movable connecting member connects together the load application mechanism and movable axle means, the axle means being attached fixedly to the connecting member, wherein the connecting member comprises a generally L-shaped member having one leg which extends generally parallel to the axle means and an axial and moment load application mechanism attached to the end of said one leg, and a radial load application mechanism attached to said one leg disposed substantially orthogonally relative to said axle means.

2. Test apparatus in accordance with claim 1, wherein the axial and moment load application mechanism comprises a pair of pivotally mounted axial and moment load cylinders, disposed substantially parallel relative to the axle means, the load cylinders being attached to the end of said one leg of the L-shaped member at different distances from the axle means.

3. Test apparatus in accordance with claim 2, wherein the axle means comprises a mandrel onto which the wheel is mounted, the mandrel simulating the aircraft axle load deflection characteristics.

4. Test apparatus in accordance with claim 1, wherein the axial and moment load application mechanism comprises an axial and moment load cylinder pivotally mounted and disposed substantially in parallel alignment relative to the axle means and offset from the axle means an amount corresponding to and realistically simulating a wheel and tire combination having a load radius of predetermined magnitude and a tire contact patch of predetermined size and position.

5. Test apparatus in accordance with claim 4, wherein the axle means comprises a mandrel onto which the wheel is mounted, the mandrel simulating the aircraft axle load deflection and bearing preload characteristics.

6. Test apparatus in accordance with claim 5, wherein the axial and moment load cylinder offset from the axle means is adjustable.

7. Test apparatus in accordance with claim 1, wherein the axle means comprises a mandrel onto which the wheel is mounted, the mandrel simulating the aircraft axle load deflection characteristics.

8. Test apparatus in accordance with claim 1, wherein the motor means includes a support structure to which the wheel is affixed, rotation of the support structure effecting rotation of the wheel.

9. Test apparatus in accordance with claim 1, wherein the radial load application mechanism comprises a radial load cylinder pivotally mounted and disposed substantially in a plane corresponding to the center plane of the wheel means.

10. Test apparatus in accordance with claim 9, wherein the axial load application mechanism comprises at least one load cylinder pivotally attached to the end of said one leg and disposed generally parallel to the axle means, actuation of the radial and moment load cylinders effecting, selectively, radial and moment loading upon the bearings.

11. Test apparatus in accordance with claim 10, wherein selective actuation of the load cylinders effects a net radial load upon the bearings.

12. Test apparatus in accordance with claim 1, wherein the load sensing devices communicate to the control means the magnitudes of loads applied by the load mechanisms to the axle means.

13. Test apparatus in accordance with claim 12, further including acoustic sensing means adapted for selectively sensing acoustic emissions of the wheel bearings and optionally including thermal sensing means for sensing the temperature of the wheel bearings.

14. Test apparatus in accordance with claim 13, wherein the control means receives and responds to control signals corresponding to sensed loads from the load sensing devices, motor speed and acoustic emissions of the wheel bearings.

15. Test apparatus in accordance with claim 13, further comprising belt drive means for rotation of the drive coupling.

16. Test apparatus in accordance with claim 1, wherein the axle means includes an inboard end fixedly attached to the fixed support, the apparatus further comprising an annular drive coupling coupled to the wheel web, the drive coupling including an inboard annular portion rotatably journaled upon an inboard load reaction bearing housed proximal the fixed attachment of the axle means to the fixed support, and an outboard annular portion rotatably journaled upon and outboard load reaction bearing housed distal the fixed attachment of the axle means to the fixed support, the inboard and outboard load reaction bearing housings respectively being pivotally attached to radial and moment hydraulic load cylinders, one of said load reaction bearing housings being pivotally attached to an axial and moment hydraulic load cylinder.

17. Test apparatus in accordance with claim 1, wherein the wheel bearings comprise aircraft wheel bearings and the wheel comprises wheel means for an aircraft.

18. A method for testing bearings by a testing apparatus, comprising the steps of (a) rotatably disposing wheel means including a wheel hub and wheel web on non-rotatable axle means via bearings, (b) connecting the wheel web with motor means for rotation of the wheel, (c) attaching an axial and moment load mechanism to a movable connecting member connected to one of the axle means and the wheel web so that the axial and moment load mechanism is disposed in substantially offset manner relative to the axle means, (d) attaching a radial load mechanism to the connecting member so that the radial and moment load mechanism is disposed substantially orthogonal relative to the axle means, (e) providing control means for controlling operation of the testing apparatus, (f) providing load sensing devices for sensing loads imposed by the mechanism on the bearings, and (g) activating selectively, via the control means, the respective load mechanism in order to effect through the wheel web and axle means the selective imposition of radial, axial and moment loading upon the bearings so that the bearings experience realistic operating conditions when the wheel means is at rest and during rotation of the wheel means by the motor means, further comprising the step of providing the connecting member as a generally L-shaped member having one leg which extends generally parallel to the axle means and the axial and moment load mechanism attached to the end of said one leg and a radial load cylinder attached to said one disposed substantially perpendicular relative to said one leg.

19. A method for testing bearings by a testing apparatus, comprising the steps of (a) rotatably disposing wheel means including a wheel hub and wheel web on non-rotatable axle means via bearings, (b) connecting the wheel web with motor means for rotation of the wheel, (c) attaching an axial and moment load mechanism to a movable connecting member connected to one of axle means and the wheel web so that the axial and moment load mechanism is disposed in substantially offset manner relative to the axle means, (d) attaching a radial load mechanism to the connecting member so that the radial and moment load mechanism is disposed substantially orthogonal relative to the axle means, (e) providing control means for controlling operation of the testing apparatus, (f) providing load sensing devices for sensing loads imposed by the mechanisms on the bearings, and (g) activating selectively, via the control means, the respective load mechanisms in order to effect through the wheel web and axle means the selective imposition of radial, axial and moment loading upon the bearings so that the bearings experience realistic operating conditions when the wheel means is at rest and during rotation of the wheel means by the motor means, further comprising the step of providing acoustic sensing means adapted to sense acoustic emissions of the wheel bearings.

20. A method for testing bearings by a testing apparatus, comprising the steps of (a) rotatably disposing wheel means including a wheel hub and wheel web on non-rotatable axle means via bearings, (b) connecting the wheel web with motor means for rotation of the wheel, (c) attaching an axial and moment load mechanism to a movable connecting member connected to one of the axle means and the wheel web so that the axial and moment load mechanism is disposed in substantially offset manner relative to the axle means, (d) attaching a radial load mechanism to the connecting member so that the radial and moment load mechanism is disposed substantially orthogonal relative to the axle means, (e) providing control means for controlling operation of the testing apparatus, (f) providing load sensing devices for sensing loads imposed by the mechanisms on the bearings, and (g) activating selectively, via the control means, the respective load mechanisms in order to effect through the wheel web and axle means the selective imposition of radial, axial and moment loading upon the bearings so that the bearings experience realistic operating conditions when the wheel means is at rest and during rotation of the wheel means by the motor means, further comprising the step of providing acoustic sensing means adapted to sense acoustic emissions of the wheel bearings, further comprising the steps of rotating the wheel, sensing a baseline acoustic emission level for the wheel bearings and terminating the test when a predetermined increase in acoustic emission level is sensed and optionally sensing a baseline temperature for the wheel bearings and terminating the test when a predetermined increase in temperature is sensed.

21. The method in accordance with claim 20, further comprising communicating to the control means the magnitudes of the loads applied to the axle means and the acoustic emissions of the wheel bearings.

* * * * *